United States Patent [19]

Flammer, III, et al.

[11] Patent Number: 5,453,977
[45] Date of Patent: Sep. 26, 1995

[54] METHOD FOR NETWORK CONFIGURATION VIA THIRD PARTY QUERY

[75] Inventors: George H. Flammer, III, Cupertino; William E. San Filippo, III, Mountain View, both of Calif.

[73] Assignee: Metricom, Inc., Los Gatos, Calif.

[21] Appl. No.: 193,377

[22] Filed: Feb. 8, 1994

[51] Int. Cl.[6] .............................. H04L 12/56; H04B 7/26
[52] U.S. Cl. ..................... 370/54; 370/94.1; 370/95.2; 340/825.54; 455/56.1
[58] Field of Search ............................... 370/54, 60, 60.1, 370/85.8, 94.1, 94.2, 94.3, 95.2; 340/825.08, 825.54; 379/92, 58; 455/54.1, 54.2, 56.1

[56] References Cited

U.S. PATENT DOCUMENTS

| | | | |
|---|---|---|---|
| 4,939,726 | 7/1990 | Baran et al. | 370/94.1 |
| 5,243,592 | 9/1993 | Perlman et al. | 370/94.3 |
| 5,276,680 | 1/1994 | Messenger | 455/54.2 |
| 5,295,154 | 3/1994 | Meier et al. | 370/60 |

*Primary Examiner*—Hassan Kizou
*Attorney, Agent, or Firm*—Townsend and Townsend and Crew; Stephen J. LeBlanc; Kenneth R. Allen

[57] ABSTRACT

In a mesh communication network, new network nodes acquire information about nearby nodes to which they may communicate through a third-party query whereby an established node with which a new node can communicate is queried to provide a list of nodes in the vicinity of the new nodes with which the new node is likely to be able to communicate. The new node uses this list in attempting to establish communication links and then repeats the third-party query for each node in the list to which it can communicate.

12 Claims, 2 Drawing Sheets

METHOD FOR NETWORK CONFIGURATION VIA THIRD PARTY QUERY

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

MICROFICHE APPENDIX

A microfiche appendix including 16 frames on one fiche is included herewith.

BACKGROUND OF THE INVENTION

The invention relates generally to a method for data communication between remote nodes and more specifically to a method for configuring a netlist network without the use of a network controller or directory.

Packet communication is a form of data communication whereby segments or packets of data are routed with error checking and confirmation of receipt. Packets may be transmitted directly between a source and destination or relayed via relay stations. Several methods of data packet routing are known.

One method is known as directory-based routing. According to this method the address in the header of a packet is used as an index to a directory of packet routing lists stored in a transmitting or source node. A packet routing list consists of an ordered list of packet node identifiers or call signs that represent a transmission path from the transmitting node to the destination. Packet routing lists must be prepared with knowledge about the connectivity of each node in the network. Directory-based routing schemes require continued maintenance and communication of network interconnection information employed in the directory. Each of these functions drains network resources and this can severely reduce performance in a large network. However, directory-based routing techniques have the advantage of permitting optimization of routing for a wide variety of network parameters, including data delay, throughput, reliability, priority and the like.

Another basic routing technique is the non-directory-based routing technique. In non-directory-based routing, the complexities associated with directory-based routing techniques are avoided. There is no need to store connectivity information for each transmitting node in the network thus reducing the amount of overhead processing that must be done by the network to preserve network connections. However, non-directory-based routing techniques generally do not permit network parameter optimization.

In U.S. Pat. No. 4,939,726, issued to Baran, et al., and assigned to the assignee of the present invention, a non-directory-based routing method and system that permit network parameter optimization are disclosed. According to the method described therein, each stationary node in a network is uniquely identified by absolute geographical coordinates or by a code indicating absolute location in an external coordinate-based reference system (node coordinates). Such absolute geographical coordinates or the equivalent are employed as part of a packet identifier for each packet. A means at each node through which a packet is routed uses the packet destination coordinates and the node coordinates of its neighboring nodes to determine a desired forwarding route of a data packet. The routing may be prioritized according to preselected criteria, preferably achieving optimum forward progress, that is, maximum forward progress using the least amount of power and taking into account characteristics of the system.

Accordingly, the disclosed packet routing method requires no routing directory or table to perform data routing. However, with no routing directory or table, a question arises as to how individual nodes will first become aware of the nodes with which they are able to communicate.

The prior art answer to this question may be best described by the Utilinet network, developed by the assignee of the present invention. In Utilinet, each Node upon power up sends very long bursts of acquisition/synchronization packets on all possible channels on which another node may be receiving. There may be hundreds of possible channels and hundreds of nodes in range. Each node that receives an acquisition/synchronization packet from the newly powered up node, responds with an acknowledgement packet. From these acknowledgement packets, the newly powered-up node constructs a node link list for itself, storing information about all the nodes with which it can communicate.

While this method effectively allows a newly powered-up node to learn about nodes with which it may communicate, it is very consuming of network resources, it is very slow, and it offers a great possibility that a particularly advantageous close node will be missed because it will have been unavailable when the acquisition/synchronization packet was sent by the newly powered up node.

What is needed is a method for allowing new nodes in a network to quickly and efficiently acquire a Node List of nodes with which they can communicate.

SUMMARY OF THE INVENTION

According to the invention, in a mesh network, newly powered-up nodes acquire information about nearby nodes through a third-party query of a node with which communication has been established. Each node, as it is turned on, sends out a sequence of acquisition packets on random channels until the newly turned-on node receives an acknowledgment from a node that can hear it. Once the new node hears from one established node in the network, the new node uses that established node as a third party to acquire links with other nodes. The new node requests the established node to transmit its node link list. The new node then sends acquisition packets to the nodes on the node's node link list and when it receives acknowledgments from those nodes it adds them to its own node link list.

The method according to the invention works both for roaming nodes in the network as they move from place to place and for stationary nodes when they are initially turned on.

The invention will be better understood by reference to the following detailed description in connection with the accompanying drawings.

DETAILED DESCRIPTION OF SPECIFIC EMBODIMENTS

Figure 1:
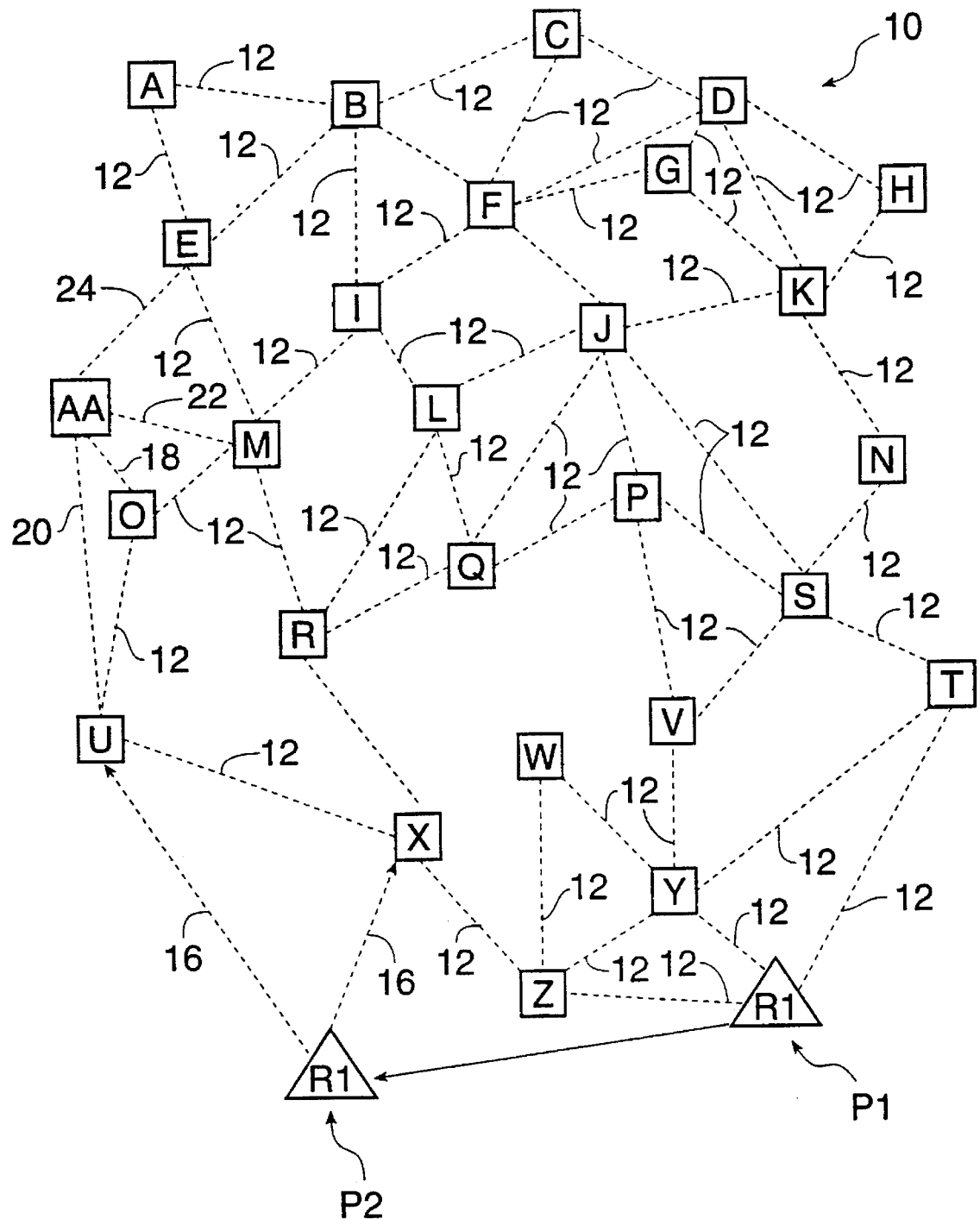
FIG. 1 is a block diagram illustrating a general data network topology with a roaming node of a type in which the method according to the invention would be useful.

FIG. 1 shows a data network 10. The network 10 consists of stationary nodes labelled A through Z and roaming node R1 interconnected by established links 12 representing allowable communication links between nodes. Newly powered-up node AA acquires links 18, 20, 22, and 24 by the method according to the invention. Roaming node R1 acquires links 16 when it moves from position P1 to P2.

When node AA is powered on, it has no information regarding the neighboring nodes with which it may communicate. It begins to transmit acquisition packets on some of its hundreds of possible communication channels and it waits to receive an acknowledgement on one of the channels. By way of example, it may receive an acknowledgement from node O and establish a communication link 18. With this link established, node AA puts node O on node AA's node link list and sends a request to node O asking node O to transmit node O's entire node link list. Node O transmits its node link list, indicating that it can communicate with nodes U and M and giving information about the channels upon which U and M communicate. Node AA then sends a acquisition packet directed at node U, and waits for a acknowledgement. If the packet is acknowledged, node AA establishes link 20 and adds U to node AA's node link list. AA then asks U to transmit U's node link list and node U does so, indicating it can communicate with node O and X. Node AA is aware that is has already established a link with O and so only attempts to establish a link with X, which fails because X is too remote from node AA for there to be communication. Node AA then attempts to establish a link with node M, which is successful and link 22 is established. Node M transmits its node link list, consisting of nodes E, I, L, R, and O. Node AA attempts to establish a link with each of the new nodes E, I, L, and R, and is successful only with E, establishing link 24. Node AA's link list is then established at E, M, O, and U. Node E transmits its node link list, consisting of nodes A, B, I, M and O. Node AA is aware that it has already established links with nodes M and O and that it has already attempted to establish a link with node I but failed. Node AA then attempts to establish a link with only the newly seen nodes, A and B, but it is not successful with either of them. At this point, node AA concludes that it has learned about all the nodes to which it may communicate by using the information about the network that is known to the established nodes in the network. In a network where there may be hundreds of possible communication channels, this method of third party query to establish node links greatly reduces the time and network traffic necessary for node AA to establish its node link list.

Data network 10 also includes a roaming node R1, which operates as do the other nodes in the network but which may move from place to place. When node R1 has been stationary for a while, at position P1 for example, it has established a number of communication links 12. When node R1 moves to a new position, such as P2, some or all of its established communication links will no longer be operable. Node R1 then establishes new communication links 16 through the same third party query process just described with a difference in one embodiment of the invention that R1 begins the third party query by requesting that its communication links that are still active at its new position transmit their link lists and then directing acquisition packets to the nodes on those link lists.

While the network operation according to the invention has been specifically described for the sake of clarity, a number of alterations or modifications in the operation are possible. Node AA may initially transmit data acquisition packets on several channels and then wait for acknowledgements. Node AA also may continue to transmit acquisition packets at random on unoccupied channels even after having established its node link list in order to insure that an available node has not remained unknown. Node AA may specifically and separately request a node to send its net link list after a communication link has been established, or a node may transmit its net link list as a part of its acknowledgement packet either automatically or in response to a request by node AA contained in the synchronization packet.

Figure 2:
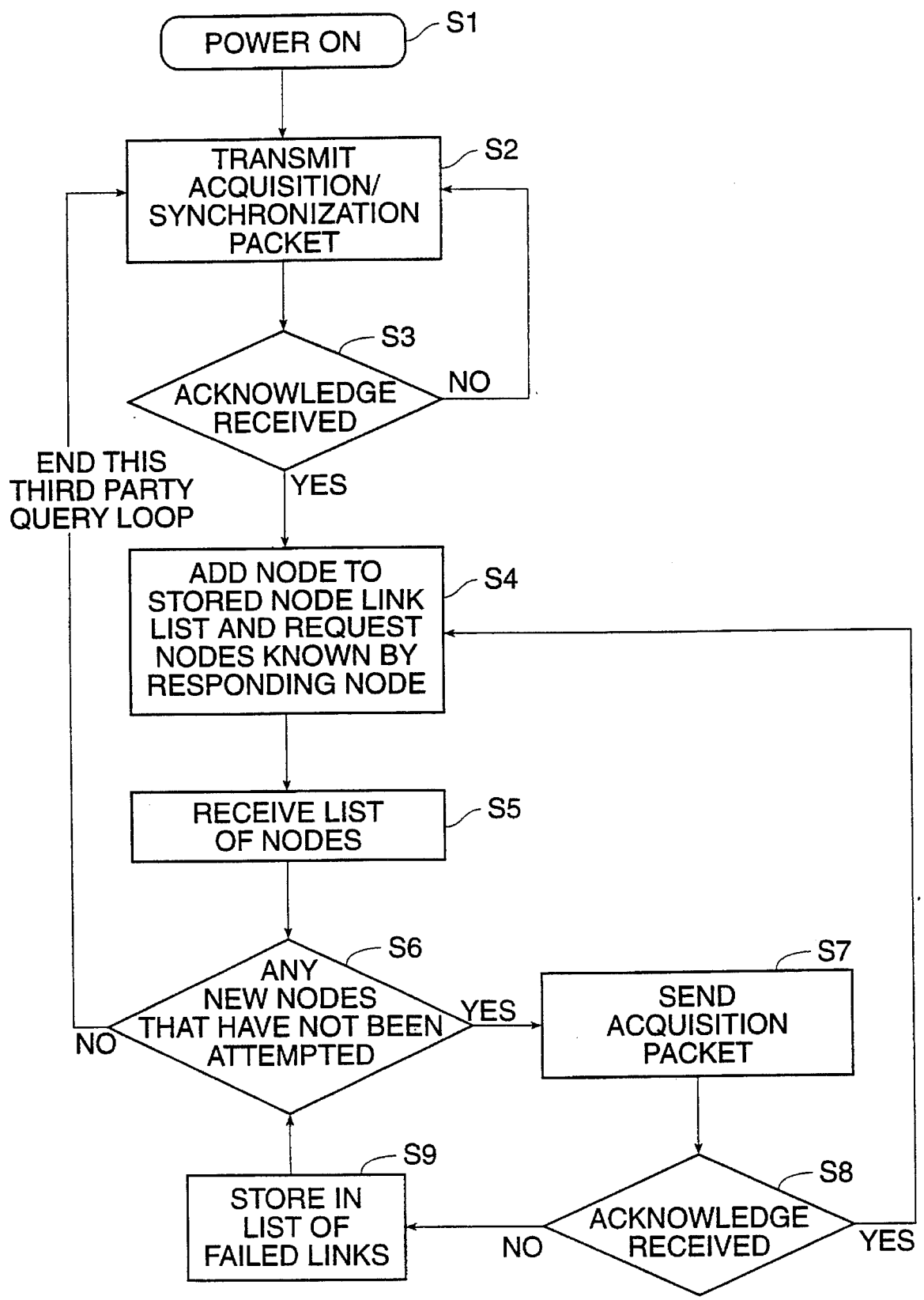
FIG. 2 is a flow chart describing the operation of a new node upon first establishing communication with the network.

FIG. 2 depicts a flow chart illustrating the operation of a node in acquiring its node net list via third party query according to the invention. The process begins when the acquiring node is turned on or moves to a new location (Step S1). The acquiring node transmits acquisition/synchronization packets on various network channels (Step S2). The acquiring node then waits to receive an acquisition/synchronization acknowledgement packet back from each stationary node that heard a packet (Step S3) and the acquiring node adds each of those nodes to its own node link list and then sends a request to each of the nodes for which it has established a communication link for that node to transmit a third party node link list (Step S4). The acquiring node receives third party node link lists from the nodes to which it has established communication links (Step S5). The acquiring node examines these received node link lists to determine if any of the nodes in these list are new nodes with which it has not yet attempted to communicate (Step S6). If there are any new nodes, the acquiring node then attempts to establish a communication link with each of these new nodes by transmitting acquisition/synchronization packets to each of these nodes (Step S7). When an acknowledgement is received from any of these new nodes, the acquiring node establishes a communication link with that node and then repeats the process starting at Step S4 (Step S8). If an acknowledgement is not received from a node, according to one alternative embodiment, information regarding that node may be stored in a failed communication table (Step S9). This process continues until the acquiring node has attempted to establish a communication link with all the nodes that it has received through third party query of each node with which it can communicate. The process stops when there are no nodes in any of the returned third party node link lists with which the acquiring node has not already established a communication link or attempted to communicate (Step S6). Once the node has completed acquiring information through third party query, it returns to step S2 and continues to periodically send acquisition/synchronization packets on random channels in order to determine if there are any nodes in range with which it has not yet established a communication link. If an acknowledgement is received on any of these random channels (Step S3), the third party query process beginning at Step S4 is resumed again.

The invention has now been explained with reference to specific embodiments. Other embodiments will be apparent to those of ordinary skill in the art. It is therefore not intended that this invention be limited except as indicated by the appended claims.

What is claimed is:

1. In network with a plurality of nodes, a method by which a node may acquire a list of communication links comprising the steps of:

transmitting on random channels link acquisition packets;

receiving a response packet from at least a first established node, said established node being a node that has acquired a plurality of links to neighboring nodes;

obtaining from said first established node a link list of said first established node;

utilizing said link list to direct acquisition packets to nodes on said link list;

receiving a response packet from each node on said link list which can hear said acquisition packets; and adding each node from which a response packet is received to said list of communication links.

2. The method according to claim 1, further comprising the step of repeating said obtaining step, said utilizing step, said receiving step, and said adding step for each node that responds to any acquisition packet from said acquiring node.

3. The method according to claim 1 wherein said network uses non-directory-based routing.

4. In a digital mesh packet communication network having a plurality of stationary nodes and roaming nodes, each stationary node and roaming node capable of transmitting and receiving data packets on at least one of a plurality of channels to and from at least one other node, a method for configuring a node to acquire a list of new communication links comprising the steps of:

transmitting link acquisition packets on a random sequence of channels until a response is received on at least one channel from at least a first established node, said established node being a node that has acquired a plurality of links to neighboring nodes;

obtaining from said first established node a list of each node with which said first established node can communicate;

directing link acquisition packets to nodes on said list;

receiving a response packet from each node on said list which can hear said acquisition packets; and adding each node from which a response packet is received to said list of new communication links.

5. The method according to claim 4 further comprising the step of repeating said obtaining step, said directing step, said receiving step, and said adding step for each node that responds to any acquisition packet from said acquiring node.

6. The method according to claim 4 wherein said network uses non-directory-based routing.

7. The method according to claim 4 wherein each of said stationary nodes is uniquely identified by absolute geographic coordinates.

8. The method according to claim 4 wherein a roaming node changing its geographic location from a first location at which it had established a list of communication links to a second location, transmits, at said second location, link acquisition packets to those nodes with which it was able to communicate when it was at said first location.

9. In a digital mesh packet communication network having a plurality of stationary nodes and roaming nodes, each stationary node and roaming node capable of transmitting and receiving data packets on at least one of a plurality of channels to and from at least one other node, a method for a new node to acquire information regarding available communication links in the network comprising the steps of:

transmitting link acquisition packets on a plurality of channels until a response is received on at least one channel from at least a first established node, said established node being a node that has acquired a plurality of links neighboring nodes;

storing at said new node data regarding the communication link with said first established node in a link table;

obtaining from said first established node a first list of nodes with which said first established node can communicate;

directing acquisition packets to nodes on said first list;

receiving a response packet from each node on said first list which can hear said acquisition packets;

adding data regarding communication links with each node on said first list that responds to said link table and storing information regarding nodes that do not respond in a failed communication table;

acquiring from each of said responding nodes, a second list of nodes with which each of said responding nodes can communicate;

comparing said nodes on said second lists with said nodes in said node link table and said failed communication table;

directing link acquisition packets to nodes on said second lists that are not on said link table or said failed communication table;

establishing communications links with nodes that respond by repeating said receiving step, said adding step, said acquiring step, said comparing step and said directing step for each node that is placed on said link table unit no new nodes are added to said link table.

10. The method according to claim 9 wherein said network uses non-directory-based routing.

11. The method according to claim 9 wherein each of said stationary nodes is uniquely identified by absolute geographic coordinates.

12. The communications network according to claim 9 wherein a roaming node changing its geographic location from a first location at which it had established a list of communication links to a second location, transmits, at said second location, link acquisition packets to those nodes with which it was able to communicate when it was at said first location.

* * * * *